United States Patent
McIlroy

(10) Patent No.: US 9,288,088 B1
(45) Date of Patent: Mar. 15, 2016

(54) SYNCHRONIZING THE BEHAVIOR OF DISCRETE DIGITAL DEVICES

(71) Applicant: Guy T. McIlroy, Los Gatos, CA (US)

(72) Inventor: Guy T. McIlroy, Los Gatos, CA (US)

(73) Assignee: Pi Variables, Inc., Laguna Beach, CA (US)

( * ) Notice: Subject to any disclaimer, the term of this patent is extended or adjusted under 35 U.S.C. 154(b) by 0 days.

(21) Appl. No.: 14/186,582

(22) Filed: Feb. 21, 2014

Related U.S. Application Data

(60) Provisional application No. 61/767,937, filed on Feb. 22, 2013.

(51) Int. Cl.
    *H04L 7/00*    (2006.01)
    *H04L 25/40*   (2006.01)

(52) U.S. Cl.
    CPC ..................... *H04L 25/40* (2013.01)

(58) Field of Classification Search
    CPC .................................................. H04B 14/023
    USPC ......................................................... 375/256
    See application file for complete search history.

(56) References Cited

U.S. PATENT DOCUMENTS

| | | | |
|---|---|---|---|
| 3,500,378 A | 3/1970 | Pickering et al. | |
| 3,787,867 A | 1/1974 | Dodge et al. | |
| 4,132,983 A | 1/1979 | Shapiro | |
| 4,827,245 A | 5/1989 | Lipman | |
| 5,438,495 A | 8/1995 | Ahlen et al. | |
| 6,929,378 B2 | 8/2005 | Wang | |
| 7,088,222 B1 | 8/2006 | Dueker et al. | |
| 7,106,179 B1 | 9/2006 | Dueker et al. | |
| 7,563,158 B2 | 7/2009 | Haschke et al. | |
| 8,154,424 B2 | 4/2012 | Selevan | |
| 2002/0154787 A1 | 10/2002 | Rice et al. | |
| 2002/0175831 A1 | 11/2002 | Bergan et al. | |
| 2003/0164666 A1 | 9/2003 | Crunk | |
| 2004/0056779 A1 | 3/2004 | Rast | |
| 2004/0100396 A1 | 5/2004 | Antico et al. | |
| 2006/0072306 A1 | 4/2006 | Woodyard | |
| 2007/0038743 A1 | 2/2007 | Hellhake et al. | |
| 2007/0099625 A1* | 5/2007 | Rosenfeld | 455/456.1 |
| 2007/0194906 A1 | 8/2007 | Sink | |
| 2007/0222640 A1 | 9/2007 | Guelzow et al. | |
| 2008/0042866 A1 | 2/2008 | Morse et al. | |
| 2008/0091304 A1 | 4/2008 | Ozick et al. | |
| 2008/0242220 A1* | 10/2008 | Wilson et al. | 455/3.04 |
| 2009/0115336 A1 | 5/2009 | Wang | |
| 2009/0187300 A1 | 7/2009 | Everitt | |

(Continued)

OTHER PUBLICATIONS

Finley, M.D. et al., "Sequential Warning Light System for Work Zone Lane Closures," Texas Transportation System, (2011) pp. 1-23.

(Continued)

*Primary Examiner* — Lihong Yu

(74) *Attorney, Agent, or Firm* — Robert D. Buyan; Stout, Uxa & Buyan, LLP

(57) ABSTRACT

Methods, devices and systems for synchronizing actions taken by digital devices in a group wherein the digital devices to use a flocking protocol to establish time or behavior synchronization between individual digital devices within the group. The flocking protocol includes the transmission of synchronization information from one device to neighboring devices within the group and the processing/use of such synchronization information by the devices to synchronize the timing and/or other characteristics of their actions.

13 Claims, 6 Drawing Sheets

(56) References Cited

U.S. PATENT DOCUMENTS

2011/0249688 A1\* 10/2011 Liu .............................. 370/503
2012/0256765 A1   10/2012 Selevan
2012/0277934 A1\* 11/2012 Ohtomo et al. ................ 701/15
2013/0260695 A1\* 10/2013 Wang ......................... 455/67.16
2014/0210373 A1   7/2014 Baret

OTHER PUBLICATIONS

Sun, C. et al., "Cost-Benefit Analysis of Sequential Warning Lights in Nighttime Work Zone Tapers", University of Missouri, Report to the Smart Work Zone Deployment Initiative, Jun. 6, 2011.

Internet Website Screen Capture, www.empco-lite.com; Sep. 6, 2010.

International Search Report and Written Opinion dated May 28, 2014 in PCT Application US2014/017756. International Filing Date Feb. 21, 2014.

Non-Final Office Action Dated Mar. 17, 2011 in U.S. Appl. No. 12/381,565.

Non-Final Office Action Dated Nov. 8, 2012 in U.S. Appl. No. 13/440,930.

Non-Final Office Action Dated Oct. 8, 2014 in U.S. Appl. No. 13/774,029.

Non-Final Office Action Dated Aug. 11, 2014 in U.S. Appl. No. 13/775,177.

\* cited by examiner $RSSI_{R2->R3}$ less than $RSSI_{R2->R1}$ and $RSSI_{R1->R3}$ less than $RSSI_{R1->R2}$

SYNCHRONIZING THE BEHAVIOR OF DISCRETE DIGITAL DEVICES

RELATED APPLICATION

This application claims priority to U.S. Provisional Patent Application No. 61/767,937 entitled A Method for Synchronizing the Behavior of Discrete Digital Devices filed Feb. 22, 2013, the entire disclosure of which is expressly incorporated herein by reference.

FIELD OF THE INVENTION

The present invention relates generally to the field of electronics and wireless communication and more particularly to methods, devices and systems for synchronizing actions taken by digital devices in a group wherein the digital devices to use a flocking protocol to establish time or behavior synchronization between individual digital devices within the group.

BACKGROUND OF THE INVENTION

Various types of digital electronic devices are sometimes used or deployed in groups, such as rows, arrays or other patterns. In some such situations it is desirable to cause the discrete digital devices to perform functions in a particular order or sequence dictated by their spatial position within the group. For example, signaling devices such as light-emitting devices, sound-emitting devices or radiofrequency signal-emitting devices, are sometimes placed in a row or pattern and it is desirable to cause them to emit their signals in a particular sequence. Examples of this are described in U.S. Pat. No. 8,154,424 (Selevan) and U.S. Pat. No. 8,564,456 (Selevan), the entire disclosures of which are expressly incorporated herein by reference.

Flocking is the phenomenon in which self-propelled individuals, using only limited environmental information and simple rules, organize into ordered activity. In nature, some animals (birds, fish) flock in spatial dimensions, but some also 'flock' in other dimensions, particularly time and sound (frogs, cicadas, crickets) and in time and light (fireflies).

The present invention, as described herein, applies principles of flocking behavior to digital electronic signaling devices (e.g., signaling lights, distributed network devices or other signaling devices) when deployed or positioned in self-coordinating groups.

SUMMARY OF INVENTION

The present invention provides methods, devices and systems for synchronizing actions taken by digital devices in a group wherein the digital devices to use a flocking protocol to establish time and/or space and/or behavior synchronization between individual digital devices within the group. Each digital device transmits synchronization information which is received by neighboring devices in the group. Each device uses the synchronization information that it receives to synchronize its actions (e.g., timing and/or behavior) to that of neighboring devices in the group. In some applications, this invention may be used to cause digital devices to act in a desired order or sequence. To accomplish this, the transmitted synchronization information may comprise an association matrix which is used by the devices to determine the order in which they are to perform actions and/or their relative positions within the group. In some embodiments, the association matrix may comprise a self-assigned device identifier N along with an n bit array wherein each bit represents neighboring devices in order. The synchronization information may be transmitted by any suitable means, such as by way of a frequency or other signal of determinable strength. In such instances, the devices may be programmed to determine received signal strength and to use the received signal strength to determine their respective order in the group. In some embodiments of this invention, the devices may comprise signaling devices which emit visible or other signals and the flocking protocol may be used to synchronize the timing and/or characteristics of the emitted signals. In such embodiments, the synchronization information may comprise a declaration message which contains information pertaining to the pattern and/or characteristics of the signal (e.g., signal type, interval, intensity, color, etc.) that will be emitted by that device. In some embodiments, the devices may be programmed to additionally receive and process user-generated external impulses (e.g., commands from a user interface, keyboard, computer, Smartphone, etc.) whereby a user may change the order, pattern or other characteristics of signals emitted by the devices.

Further aspects and examples of the present invention will be apparent to those of skill in the relevant art upon reading the detailed descriptions of non-limiting examples set forth below.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements.

DETAILED DESCRIPTION OF EXAMPLES

Figure 1:
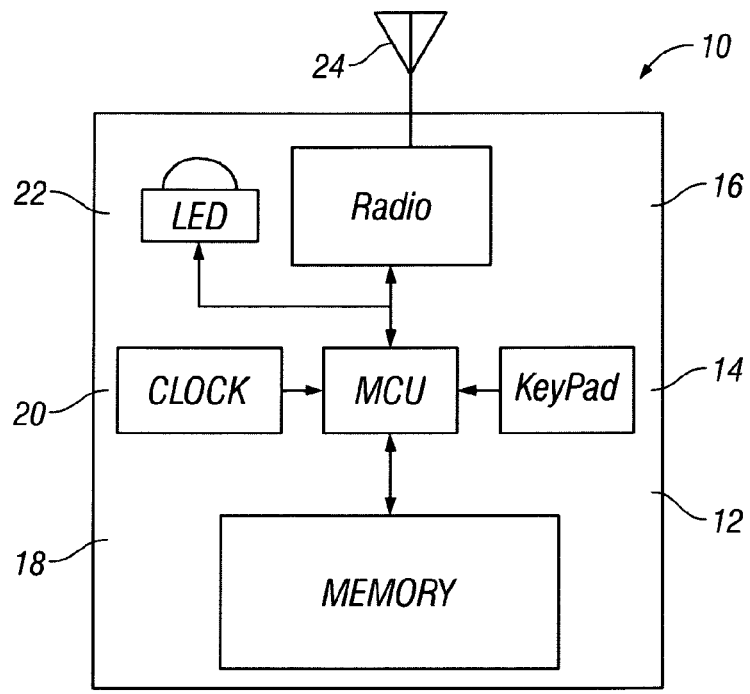
FIG. 1 is a basic component diagram of one example of a signaling device of the present invention.

The following detailed description and the accompanying drawings to which it refers are intended to describe some, but not necessarily all, examples or embodiments of the invention. The described embodiments are to be considered in all respects only as illustrative and not restrictive. The contents of this detailed description and the accompanying drawings do not limit the scope of the invention in any way.

Flocking is the phenomenon in which self-propelled individuals, using only limited environmental information and simple rules, self-organize into ordered and/or coordinated behaviors. Some animals (birds, fish) flock in spatial dimensions, but some also 'flock' in other dimensions, particularly time and sound (frogs, cicadas, crickets) and in time and light (fireflies). The present invention applies flocking principles to the synchronization of any scalar parameters or function, specifically functions that may be performed by digital devices, by treating them as a controllable dimensional attribute, thereby synchronizing the order and/or timing of functions (e.g., emission of a flash of light) performed by the digital devices (e.g., signaling lights or network synchronization). Such combination of attributes and functions being here defined as a 'behavior pattern' or 'activity pattern'.

Flocking Behavior

Flocking is a term specifically applied to collections of birds and the way they interact with each other in flight when foraging or evading predators. Other species also "flock", although the term used for difference species varies, fish shoal, insects swarm, 4 legged animals herd and 2 legged animals crowd (and sometimes herd); the fundamental principles that characterize all these behaviors are the same and will be generically referred to here as 'Flocking'.

Flocking in any species is founded on two fundamental principles; 1) the ability of each individual in a group to be able to sense variations in one or more dimensional parameters as measured by any individual in relation to a sub-set of near neighbors, and 2) the ability of each individual to process the sensed data and change local behavior using a set of rules that is the same for, and fully contained within, each individual in the flock. By these principles, there is no central coordinating body that defines the behavior of each individual, each individual judges and acts for itself with a combined apparent effect of coherent group behavior. Each individual in the group may apply these principles as a set of three simple rules; 1) separation, e.g., to a avoid crowding neighbors (short range repulsion), 2) alignment, e.g., to steer towards average heading of neighbors and 3) cohesion, e.g., to steer towards average position of neighbors (long range attraction). In some groups, individuals may use their sensing capabilities to detect neighbor distance and neighbor heading and then adjust their spacing to maintain separation (not to close) and cohesion (not too far). As an aside, the minimum separation is governed by the process/control feedback loop time and the maximum separation (minimum cohesion) is governed by sensing accuracy in detecting neighbor distance and direction. In the abstract, the term 'steer' may be viewed more broadly to control a dimensional attribute e.g. distance, time or color, to converge on a desired value for that dimensional attribute that relates in some specific way to the group or group behavior.

In some groups, spatial dimensions may be important (shoaling, swarming, herding). In some synchronous groups, the flocking principals may be applied in only one dimension, such as time. For example, the pattern of the flash may be generally fixed for all of a certain type of individuals in a group and each individual may adjust its signal emission (e.g., light flashing) by perceiving and synchronizing with signals emitted by near neighbors in the group.

The definition of a neighbor is fundamental to the viability and success of flocking. In at least some applications, it will be critical that a flock individual only consider its near neighbors. This is a practical limitation based on two fundamental tenets, 1) that the process 'engine' of the individual has very limited capacity to absorb and process data, and 2) any one individual has much less chance of 'seeing' all the individuals of a flock due to physical constraints such as sensor limitations and line of sight.

A simple processing engine simply could not process all the sense information of a large flock and the capacity of the individual becomes a limitation to scaling the maximum size of the flock. In addition, the sensors needed to see the behaviors of near neighbors are far less complex than those required to see and subtend larger numbers at greater distances. By constraining the sensing to near neighbors, simple processing mechanisms can scale to a flock of any size, though other limitations may come into play. In the case of fireflies, there are only so many mates to impress.

Ordered Individuals

General flocking behaviors do not require the notion of order, at any given time any individual may be anywhere in the flock. However, there are specific circumstances where order is important. For example, when the individual in a group migrate or move in unison, such as in a formation, each individual may position itself relative to something emitted by a neighboring individual, such as a vortex of air given off by a neighboring individual when flying in a pattern or formation. This allows occasional changing of the order or positions of individuals within the group while generally maintaining the intended formation or pattern. For example, at some point the individual leading the group may fall back into the group and a different individual may assume the lead, whereupon the group will reorganize into the intended formation or pattern with only a temporary disruption due to the changing positions of the individuals. However, in this example, each individual's sensing is primarily keyed to one other individual (that of its immediate leader or adjacent neighbor) and only secondarily to other individuals in the group and no 'leader' dictates individual behavior to coordinate the order.

In summary, a flock may be defined as a collection of individuals able to process sensed data from a limited set of neighbors using simple rules that don't vary from one individual to the next and forming a group exhibiting coherent behaviors when reacting to internal and external stimuli.

A Digital Flock

In the context of the discussion of flocking behaviors above, a digital flock may be defined as any collection of digital devices that can sense state attributes of their immediate neighbors and then adjust their own behavior based on the sensed data. Some specific components of this definition are as follows:

1) Digital Device; a device using digital electronics as the means of sensing and processing capabilities;

2) State Attributes; a set of data that defines the state of an individual;

3) Immediate Neighbors; a sub-set of the group that is defined by some arbitrary 'distance' or other dimensional metric. For example, the number 3 may be arbitrarily defined as 'further away' from the number 5 than the number 6—even though no relationship between the numbers has necessarily been implied;

4) Behavior; a predictable change in individual state as a reaction to external stimuli.

FIG. 1 shows one non-limiting example of a signaling device 10 of the present invention. This device 10 comprises a micro processing unit or MPU 12, a keypad 14, a radio 16, memory 18 (e.g., RAM/ROM/FLASH), a clock 20, an emitter 22 such as a light emitting diode or LED and a radio frequency antenna 24. It is to be appreciated that, in this example, the device 10 may be described as a traffic beacon, but alternatively such device may comprise a synchronized digital device for various other signaling purposes and applications. The MPU 12 is able to process rules stored as a program in memory 18. The emitter 22 emits a control beacon (e.g., a flash of light) when triggered to do so. The radio 16 and RF antenna 24 sense the presence of, and proximity to, other devices 10 of this type. The keypad 14 is a means by which a user may enter commands to the MPU 12 to change the group behavior or the behavior of a specific beacon. The keypad may be part of the device 10, or it may be a separate unit (e.g., a dedicated keypad, laptop computer, tablet computer, Smartphone, etc.) that communicates with the device 10 by wired or wireless connection.

With the appropriate set of embedded rules an example of which is described herein, this beacon device 10 has all the requisite attributes to qualify it to act as a member of a digital flock of digital devices as described herein. The beacon device 10 can sense what individuals it is near to, what their clock and behavior patterns are and it can adjust its own timing and emitted signal pattern in response to both neighbor input and external stimuli.

Nearest Neighbor in the Digital Flock

As described, the devices 10 may sense attributes of neighbors. As an alternative to the antenna 24 and radio 16 shown in FIG. 1, there are a number of ways the device 10 can be equipped and/or programmed to sense neighbor attributes including capacitive proximity, GPS or other sensing and reporting, radar, radio signal strength, cameras and image sensing. Most importantly, it is perfectly valid for a device to sense a neighbor's state by having that state broadcast to them. However, to behave as a flocking individual, this message must be broadcast to everyone and not be individually targeted. The unit 10 uses an RF data frame to communicate state, which has the added bonus in that the RF received signal strength (RSSI) can also be used as an additional attribute relating the state of a neighbor as a measure of physical proximity.

As an example, order is important to a traffic safety beacon. Specifically, beacons that flash in distance order (distance from the viewer) give much better depth perception and auto drivers slow down earlier. Such a beacon is an embodiment of the unit 10 that uses a unique method to simultaneously determine both nearest neighbor and order.

Unit Flocking/Unit Senses

The unit-sensing parameters are definable e.g. time, light pattern and RSSI for a traffic beacon. Each unit 10 transmits a regular synchronization frame called a 'beacon declaration message' or BDM whenever it is about to start its activity pattern. This BDM contains information pertaining to it's the unit's behavioral state, e.g. pattern, pattern characteristics and other pertinent state information. In this way, the synchronization frame serves to encode a simple mesh network. Any state information contained within the BDM ultimately reaches all participating beacons by unit to unit replication in each device BDM. Any external impulse, through the use of the keypad, that causes a change to any internal state is similarly conveyed to all participating units.

Sensing Signaling Pattern

Signaling Pattern is used here as the abstract description of the combination of timed signal emissions from one or more transducers of any given type. Pattern, in this example, thus includes the actual value and/or emission pattern but also may include any combination of dimensional attributes to be shared between units.

Local Pattern is Known from Internal Unit Memory State.

Any individual is aware of both its own pattern via its own internal memory state and its neighbor's pattern through receipt of BDMs, sensed by the radio, that include the internal state of that neighbor and which is regularly transmitted by each unit as described above.

Sensing Time

Local beacon time is sensed internally using a crystal oscillator which increments a 32 bit counter with a frequency of 2 kHz. Frequency is not important and could be any convenient frequency available to the system.

The beacon uses the difference between the time of arrival of the sync frame and the expected arrival time to correct the local clock governing when to send its own synchronization frame and when to begin its own activity pattern (e.g. to flash its LED). This time of arrival is adjusted for propagation time in such a way that both the sender and the receiver can adjust clocks based solely on receipt of the BMD.

Figure 2:
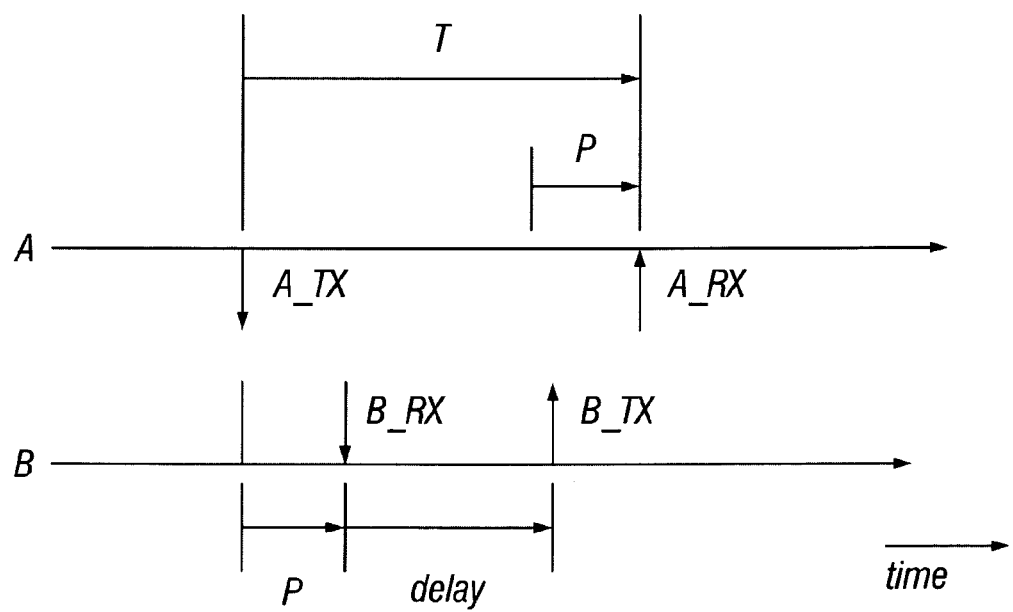
FIG. 2 is a diagram showing the manner in which devices of the present invention may be programmed to sense time variation as described herein.

Referring to FIG. 2, we define a method where by the nearest upstream neighbor A remotely synchronizes the clock of its nearest downstream neighbor B by correlating the time between an RF message transmitted from A and which includes the delay B should use in transmitting its RF message to its downstream neighbor C. Since A can also see the message B sends that is intended for C, A can then use the time from one A_TX to the next A_RX (T) to calculate P, the propagation delay such that;

$T = 2 \times P + \text{delay}$ or $P = (T - \text{delay})/2$

A can then use this propagation delay to adjust the delay value sent to B such that Bs transmission can be timed to coincide with a specific time at A. Propagation delay includes all delays in moving the message from A at any time t to B at time t' such that B's clock may be synchronized to A—including all processor and radio overheads. The key point here is that BTX is a simple broadcast message intended to convey B's internal state. Because it is broadcast at a known time in relation to Bs internal clock and can be heard by all neighbors, this message can both calibrate the propagation time and synchronize the internal clocks. Where the propagation delays are deterministic and invariant, the propagation delay need only be measured once and communicated either explicitly (in the BDM) or implicitly (in the code of the device).

Sensing Nearest Neighbors & Order

Light beacons that guide traffic down a path need to maintain order in their behavior. The order helps give operators of the traffic important visual cues as to how to navigate an indicated path or obstacle safely. In other embodiments, devices in a distributed network may synchronize various network activities. Possible but not exclusive examples are; shared disk access, bandwidth leveling, bandwidth throttling and networked resource allocation.

The challenge is how to manage order without specifically assigning it. When the units are first turned on, each unit listens for neighboring BDM frames. If there are none, then this unit is defined to be the first unit activated. If there are neighbors, then the unit determines its activation order from an association matrix embedded in the BDM messages and sent by its neighbors.

The association matrix consists of a self-assigned unit identifier N along with an n entry array such that each entry represents the visibility attributes of adjacent units in order. Thus, for example, an 8 entry association matrix is an ordered set indicating the neighbors that each beacon can see such that the entries are defined and ordered as; N−4, N−3, N−2, N−1, N+1, N+2, N+3, N+4. Nothing here need limit such a matrix to 8 entries and larger and smaller sets are envisaged.

A digital device, such as device 10, that is observing the association matrix encoded, for example, as an 8 bit visibility matrix, can promptly disambiguate a hole or gap in the ordering of units (e.g. in the bit pattern 11111011, N+2 is hole), b) an edge or end of a unit string (in the bit pattern 11111100, N+2 is end of string) and c) any out of range units (units that can be seen by other beacons, but not by itself). For (c), because each unit 10 shares it's own BDM with all other units in range, any unit can 'see' units that are in range of a neighbor, but out of range of itself. These characteristics considerably more valuable in the face of the possibility of lost frames by considering that any unit may observe and correlate multiple overlapping views of the string. Thus, for example, if unit 3 is really missing, unit 2 and 4 should both agree that it is missing (and possibly 0, 1, 5, 6 & 7 as well).

By this method, the association matrix, allows any listening device to see both the visibility and the order of any existing units within range and to determine if there is a hole in the order that it should fill or if it is able to append itself to the end of the unit string. A device of the present invention, such as light beacon device 10 of this example, may be placed at the end or middle of a group of beacons, or string, simply by the act of turning it on. Each beacon device in the group will self-assign its own identifier based on its self-identified place in the group or string. Once the beacon device 10 has self-assigned itself a place in the string, it begins to send its own BDM frames such that later arrivals can, in turn, coordinate their place in the string. After initial activation, the light beacon device 10 begins the task of activating its signal emitter 22 based on pattern data contained in the BDM. In this way each device activates its emitter 22 as part of a coordinated group or 'flock'.

Further, the association matrix allows the device to only listen to its nearest neighbors as defined by the activated entries in the matrix. This allows a device to ignore transmissions from other beacons saving both processing complexity and, in turn, significant energy of operation leading to significantly extended battery life.

One unique and important characteristic of the association matrix is that it maintains the concept of nearest neighbor independently of physical proximity. The expression nearest neighbor is here used to relate any abstract notion of order as may be pertinent to the application.

For example, this provides the ability to lay down re-entrant polygonal strings of light beacons with no confusion as to which is the correct nearest neighbor. The problem with a polygonal string is that where order is paramount, a reentrant polygon will place earlier ordered devices in close physical proximity to later order devices. Further, some devices will be out of range but still working. Without the association matrix to disambiguate, this looks like a hole in the string to any potential replacement.

In the event that a unit fails, it will stop sending BDMs. Each node then assumes unit failure and then self-synchronizes its behavior timing on the next nearest neighbor, as defined by the association matrix, as if the failed unit was still functioning (e.g. no change in flash synch, a 'hole' will appear in groups behavior) or as may be defined according to the specific needs of the application.

When a replacement unit is brought in, the new node will then listen to the BDMs for the selected string and can optionally assume that it is to replace the lowest numbered missing unit for that string (Insert') or add itself to the end of the string (if within range) ('append'). Note that the choice of insert or append may be made by a user, automatically as defined below or by other appropriate means as may be suited to the application.

Any number of beacons may be replaced in this way. This assumes overlapping beacon range (any given beacon can see more than its nearest neighbor). If beacon range does not overlap, a beacon failure will split the string in two. However, the user may add beacons to rejoin them and this will re-sync the string.

Beacon Flocking Rules

Figure 3:
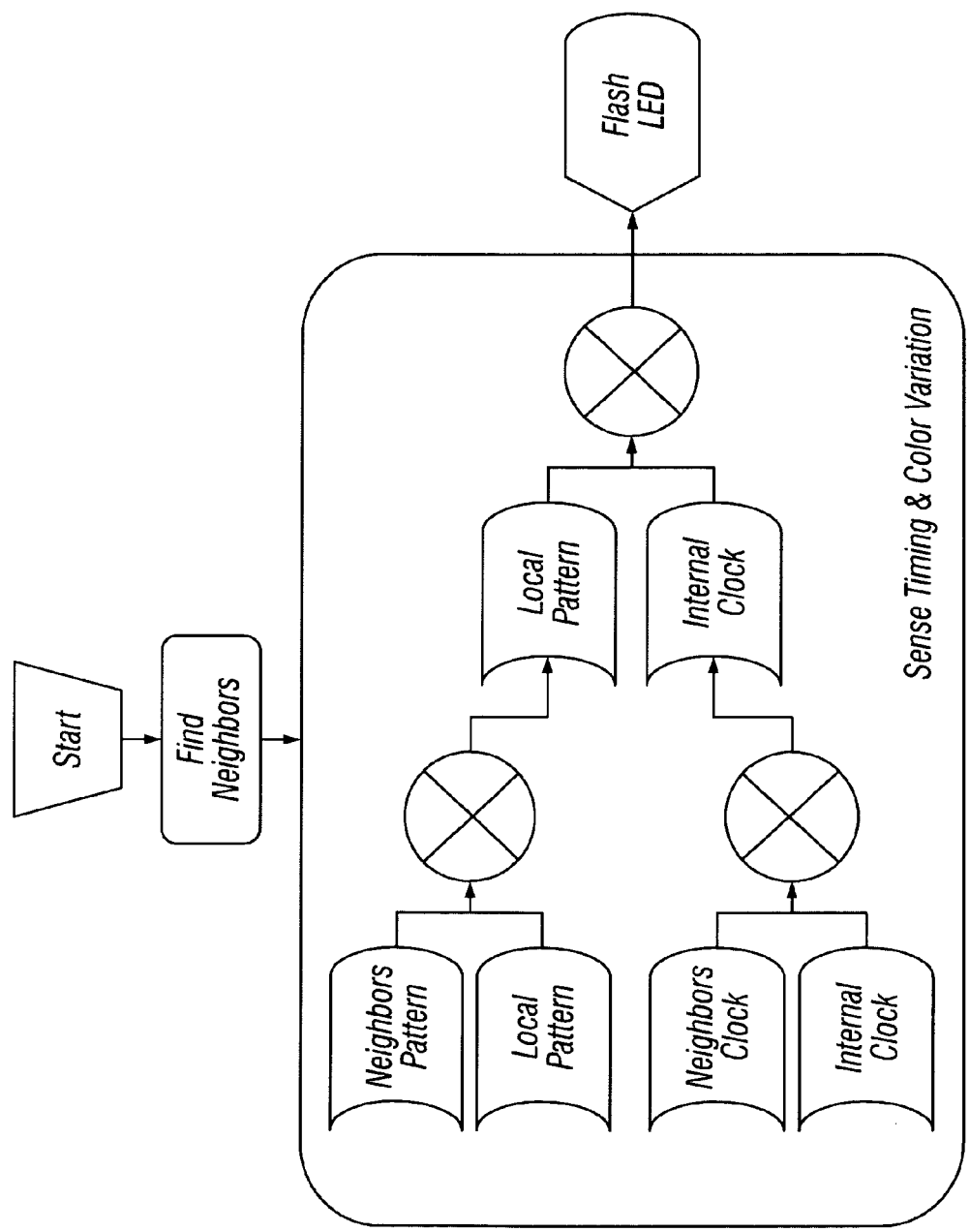
FIG. 3 is a diagram showing the manner in which devices of the present invention may be programmed to sense time, space and pattern variation as described herein.

Referring to the flow diagram in FIG. 3, the MPU 12 of each device 10 is programmed to:

Use the temporal relationship of activation as described previously to establish a flock sequence and find near neighbors.

Optimize for the minimum variation in time of one units signaling pattern from the signaling pattern of the upstream neighbor. Much as a bird in a flock may stay on station by monitoring it's distance from it's nearest neighbor, so the digital beacons also 'stay on time station' by monitoring the time of arrival of its neighbors BDM and adjusting the time of its own BDM and synchronized activity (e.g. flash) to convey its own state to all its neighbors.

Cause the emitter 22 to emit signals in a pattern that is dependent upon the pattern of signals emitted by a neighbor and/or upon its location within the group.

In at least some applications, programming of the MPU 12 in this manner enables the device 10 to use sensed data received by the radio 16 and RF antenna 24 from neighboring signal emitting devices to the immediate neighbor, ensure that:

Any given device 10 will always execute its synchronized activity (e.g. flash) in sequence wherever it is placed (and activated) in a flock of units; and/or Any given set of devices 10 will always execute the same pattern of activity when they are in a flock, unless they have been specifically told to do otherwise.

Also, in at least some applications, the device 10 and methodology of this example are useable in various ways, including but not limited to the following:

The use of the defined flocking method to maintain time and behavior synchronization between disparate digital units. Such behavior including but not limited to the emitting of light, sound, RF waves, ultrasound or other similar physical signals.

The use of the defined flocking method to maintain time and signal emission synchronization between disparate digital traffic management and similar digital signaling device.

The use of an association matrix to convey information regarding nearest neighbor status between a group of units behaving as a flock and with the purpose of maintaining and conveying device order and near neighbor state information between devices.

The use of an association matrix to determine the state of a set of near-by units for the purposes of inserting and appending a unit into the group in order.

The use of an association matrix to define a nearest neighbor in a robust, prioritized and 'fail-safe' manner using broadcast only messages not requiring message acknowledgement.

A method for correlating two clocks using an RF beacon.

The use of the defined flocking method to maintain time and behavior synchronization between disparate digital devices for the purpose of emitting sound, light, ultrasound or similar physical signals.

Flock Order

In many embodiments, the order of devices in the digital flock can be safely established randomly between units. In this case the synchronization of time and pattern only serves to maintain consistence and prevent collisions.

The determination of which signaling device in the group will first begin to emit signals may also be made in other ways. One way is for an external entity (e.g., the user who sets up the group) to designate which signaling device will be the first to begin emitting signals. Another way is for the devices within the group to themselves select an initiating device.

For example, an external entity (e.g., the user) may select a first signaling device (e.g., any device in the group) and press its ON button. Since it is the first to be energized, that first signaling device will not "hear" or receive any signals from others in the group and, therefore, will begin emitting signals itself. Then, the user may select the next signaling device (e.g., any other device in the group) and turn it on. That signaling device will then receive or "hear" signals emitted by the first signaling device and will begins to emit its own signals having the same characteristics (e.g., color, intensity, duration, etc.) as those being emitted by the first device, at a time that is offset by a pre-determined interval from each signal being emitted by the first device. The user then repeats this process until all of the devices in the group have been turned on and have begun to emit their respective signals. These signaling devices will continue to emit their signals only in the order they are turned on, unless they are additionally programmed to dynamically modify the order in which they emit their signals (e.g., flocking behavior) in response to any subsequent changes in position or number of signaling devices in the group, as provided for in this invention. Such user being also able to select any relation of time, space and pattern as may suit the application.

However, in some circumstances, the synchronization order must be established such that an external entity always sees a specific collective behavior from the digital flock. One such application is the deployment of traffic cone beacons such that the traffic cone beacon always flashes in order of its distance from an approaching vehicle. Another application would be the accession of a network in order to prevent congestion whilst at the same time maintaining data ordering.

Using the traffic signaling lamps by way of example, in this case spatial order >does< matter. It is required to have such lamps flashing in such order such that when their turn comes to 'flash' it must match the physical location in a line such that each lamp flashes in time AND space order such that the lamps may be used to manage traffic flowing in the direction the lamps flash order. We have described how a lamp maintains its time order through listening to neighbors BDMs and it is now time to describe how to assimilate space order.

An important aspect of this problem is that physical ordering is not an absolute measure of distance between the devices. As mentioned previously the arbitrary number 3 can be defined to be physically between 2 and 5, but there is no inherent notion of actual distance and a device numbered 3 could be inches from device 2 and miles from device 5 whilst still maintaining order. Accuracy and absolutes are not required in physical ordering.

For 2 or 3 dimensional space order there are a number of techniques available for use, including capacitive sensing, digital imaging and GPS. However, there is one additional method inherent in the described embodiment—use of RF signals. RF signals attenuate with the square of the distance from the transmitter. Thus any device that measures the strength of the RF signal can determine the approximate distance to the transmitter. These techniques are well established and in common use. Such a measurement is termed RSSI and is the 'received signal strength indicator' and can be used as an abstract measure of physical distance.

In any RF receiver, the measurement of RSSI provides a measure of signal strength that may be correlated with distance from the transmitter. In typical application, there are limitations in the resolution of the radio analog to digital conversion that, in turn, limit the resolution of the derived RSSI and thus the resolution of any estimated distance. We here define a method whereby the dynamic range of the RSSI measurement is increased in the following way;

A transmitter may transmit a BDM at varying power levels whilst at the same time informing the receiver what power level the BDM was transmitted by including the transmit power level in the BDM. In knowing both the transmit power level, which determines the range of the signal, and the received RSSI, the range over which the RSSI measurement may be applied is much greater, thus increasing the dynamic range of the RSSI measurement. Here all further references to RSSI include the use of this technique.

Further, it is possible to apply various filtering techniques, including averaging to improve the stability of the RSSI value. Such techniques are generally well established in the art and are assume to be included as appropriate in any measure of RSSI defined here.

In a digital unit 10, RSSI informs each unit of the signal strength of each BDM that arrives at the radio. However, RSSI is not a simple measure of distance. Various adverse effects such as multi-path, Raleigh fading and interference can variously affect RSSI such that it is a relatively noisy, course and unreliable, measure of distance.

In general, RSSI will be affected similarly for all units in proximity of each other and though RSSI is a relatively poor measure of absolute physical distance, it is a much more useful measure of relative distance. From this it is possible for an observer to say that radio A is further away than radio B, without knowing, or needing to know, by exactly how much B is further than A. For the purposes of establishing order, actual or absolute distance does not matter.

In this way, and as is clarified below, RSSI may be used as a relative distance scalar such that the inaccurate and unreliable RSSI can be used to relate flock order to physical proximity. By this method, each unit can figure out where it is in physical relationship to its neighbors. The key principal of this method is that though each unit can only directly sense RSSI of each of its neighbors, by sharing these RSSI values via the association matrix, a very usable collective measure of >relative< distances, and thus order, is available. Each device is then free to reduce such data to order, for itself, as defined below.

Figure 4:
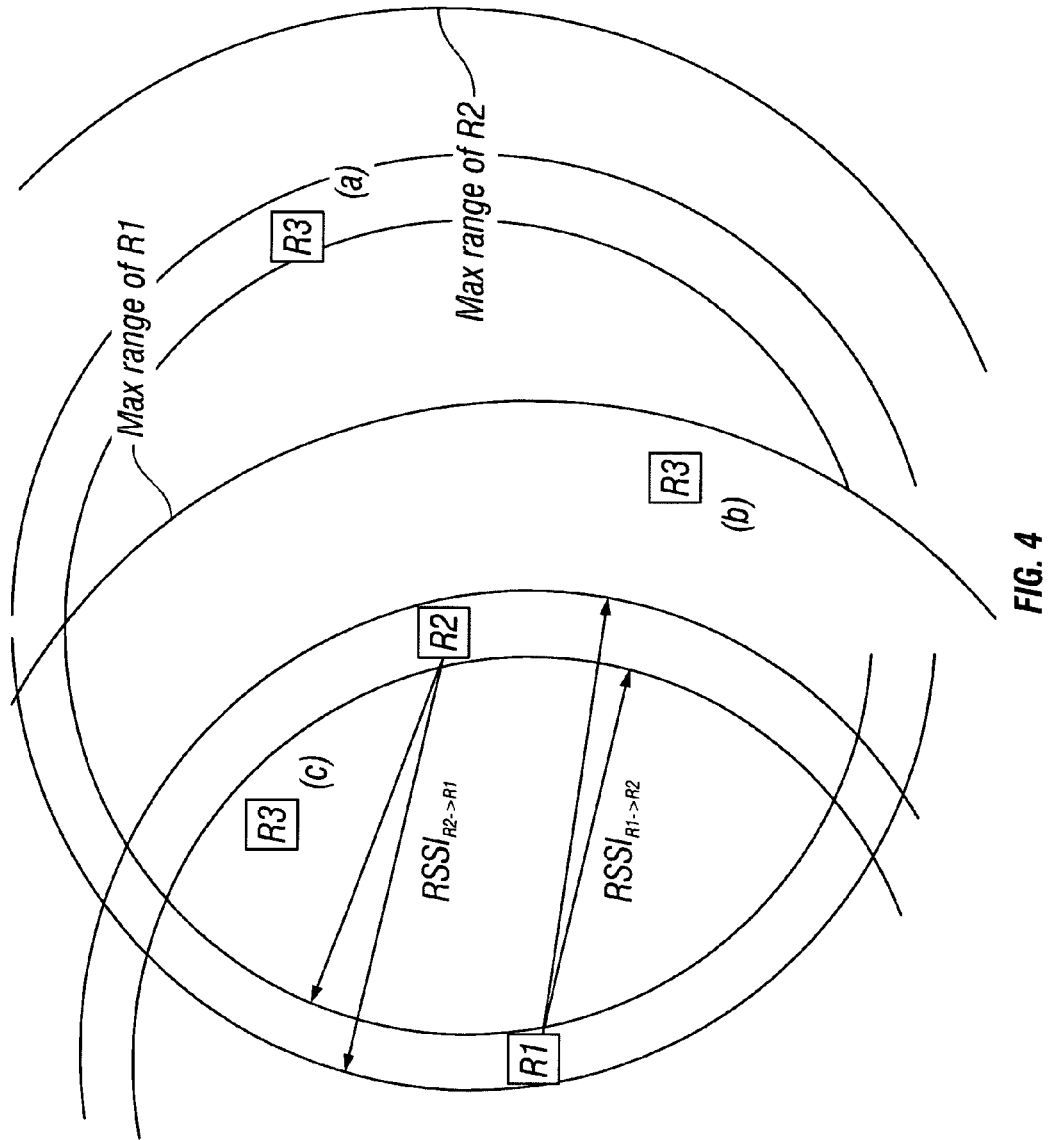
FIGS. 4 through 4C are schematic diagrams showing steps in method according to one embodiment of the present invention.
Figure 4A:
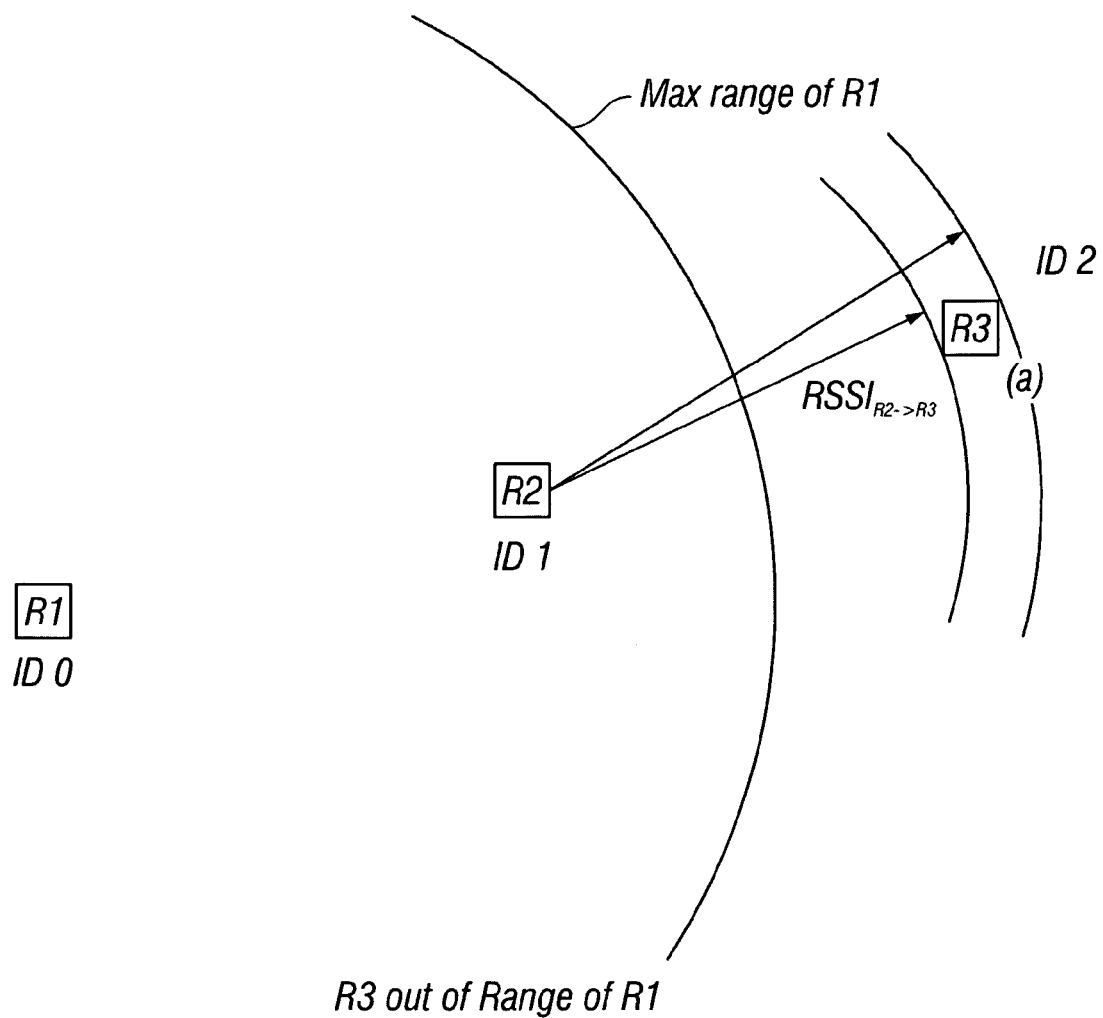
Figure 4B:
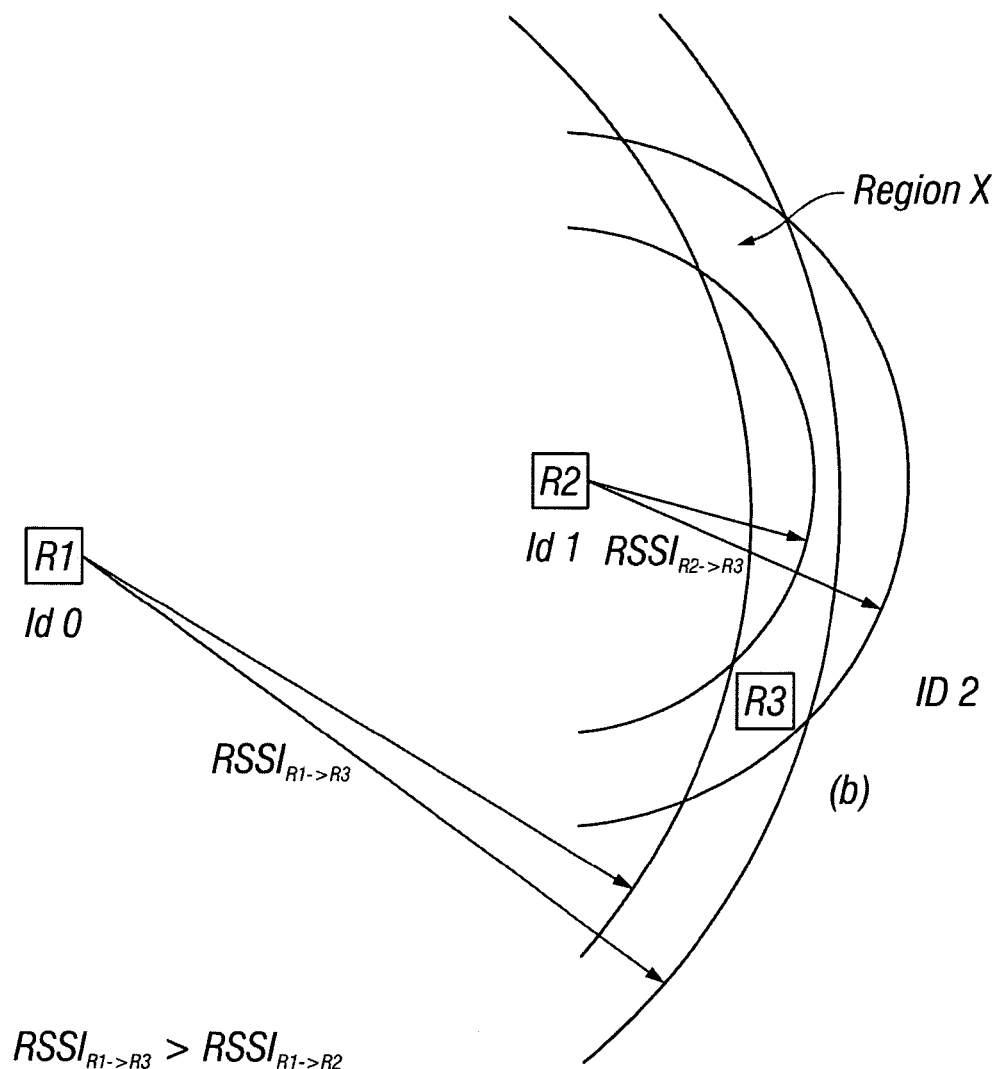
Figure 4C:
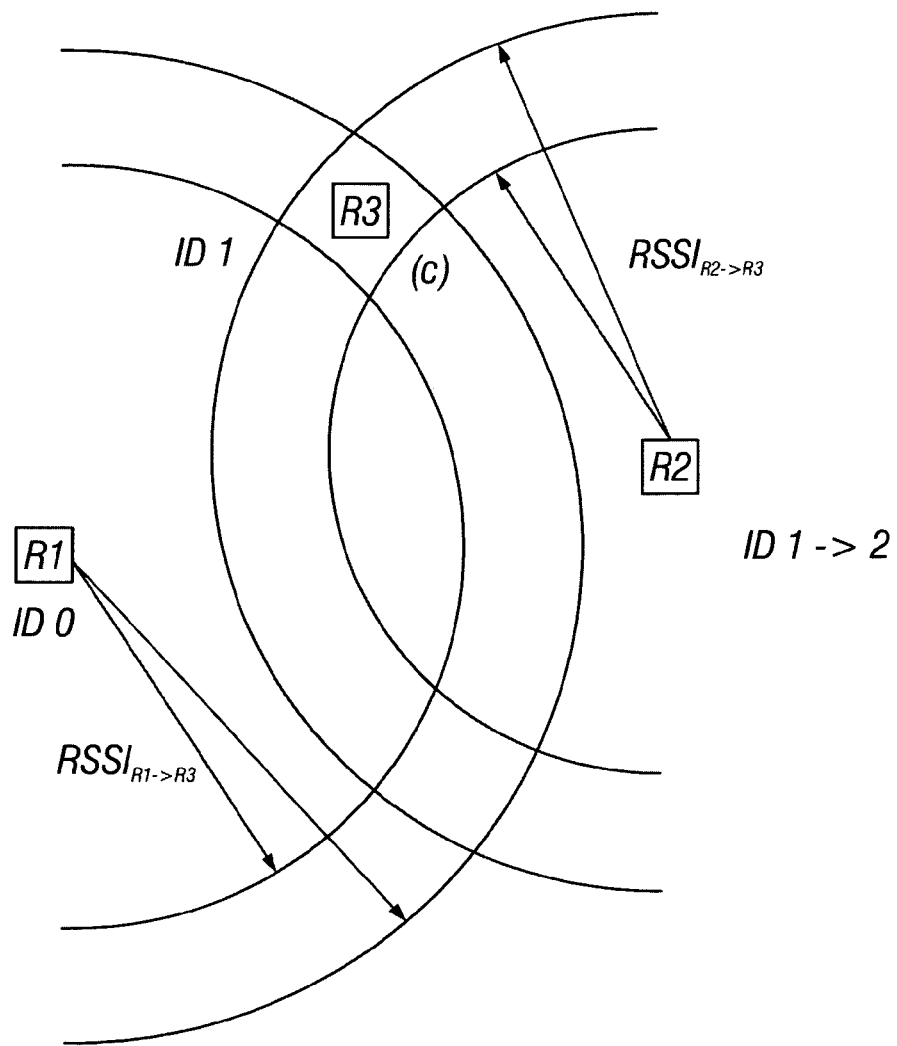

FIGS. 4 through 4C show, in schematic format, an example of how the MPUs 12 of a group of the above-described signaling devices 10 may be programmed to use RSSI to effect a desired flocking behavior. Any one of the signaling devices in the group may begin by initially listening for signal(s) emitted from another signaling device in the group. If the first device does not receive (e.g., "hear") any signal emitted from another device within the group, it will begin to emit signals (e.g., flashes of light) itself. On the other hand, if it does hear a signal emitted from a neighboring signaling device, it will begin to emit signals that have the same characteristics (e.g., color, intensity, duration, etc.) as the signal being emitted by its neighbor but offset in time, by a pre-determined interval, from the signal emitted by its neighbor.

Referring to FIG. 4, a first digital unit 10 (R1) is deployed and turned on by the user. When R1 is first deployed and turned on, its radio listens for any BDM(s). If R1 does not receive any BDM(s), it then assigns itself a device identifier of 0 and begins its sequenced activity, in this case to flash its LED according to a user defined pattern and begins to transmit a BDM detailing its current state as defined previously.

When the next device 10 (R2) is deployed and turned on, the radio listens for any BDMs for some finite period of time. R2 can be placed anywhere. If R2 is out of range of R1, R2 will not receive any BDMs and will self assign its own device identifier as 0 in exactly the same way as R1. If R2 is within range of R1, R2 a) receives the BDM from R1, b) takes the device identifier from the received frame and c) uses the RSSI as a distance scalar to place the device identifier into the association matrix. Since R2 can only see one other radio at this time (R1), R2 must then be the first follower of R1 and R2 self assigns itself the device identifier (R1 device identifier+

1) and begins its own sequenced activity (e.g., flash an LED), in time order from R1 according to the pattern conveyed to it by the BDM received from R1. It then begins to transmit a BDM detailing R2 state at a frequency defined by data in the BDM received from R1.

When the next device 10 (R3) is deployed and turned on, its radio listens for any BDMs for some finite period of time. R3 can be placed anywhere. If R3 is out of range of R1 & R2, R3 will not receive any BDMs and will self assign its own device identifier as 0 in exactly the same way as R1 & R2.

If R3 is within range of R2 but not in range of R1, as shown in FIG. 4A, R3 a) receives the BDM from R2, b) takes the device identifier from the received frame and c) uses the RSSI as a distance scalar to place the device identifier in a slot of the association matrix. Since R3 can only see one other radio at this time (R2), R3 must then be the first follower of R2 and R3 self assigns itself the device identifier 3 (R2 device identifier+1) and begins its own sequenced activity (e.g. to flash its LED) according to the pattern conveyed by the BDM received from R2 and begins to transmit a BDM detailing R3 state at a frequency defined by data in the BDM received from R2.

Alternatively, if R3 is within range of both R1 and R2, as shown in FIG. 4B, R3 then a) receives BDMs from both R1 and R2 and b) takes device identifiers and the RSSI of those BDMs. Since a BDM includes each device association matrix, R3 will also know the RSSI from R1 to R2 as such information is included in R2's BDM. The three RSSIs with the relative measures $RSSI_{R2 \to R3}$ less than $RSSI_{R1 \to R3}$ and $RSSI_{R1 \to R2}$ less than $RSSI_{R1 \to R3}$ place R3 anywhere in enclosed region X. Any location in region X is here defined as being ordered 'further' away from R1 than R2 and R3 self assigns itself the device identifier 3 (R2 device identifier+1) and begins its own sequenced activity (e.g. to flash its LED) and transmit a BDM detailing R3 state according to the pattern defined by data in the BDM received from R2.

Alternatively, if R3 is in range of both R1 and R2 in the manner shown in FIG. 4C, R3 will receives BDMs from both R1 and R2 and is provided the device identifiers and the RSSI of each by those BDMs. Since a BDM includes each device association matrix, R3 also knows the RSSI from R1 to R2 as it is shared in R2's BDM. R2 also knows the RSSI from R2 to R1 as it is also shared in R1's BDM. The three RSSIs with the relative measures $RSSI_{R2 \to R3}$ less than $RSSI_{R2 \to R1}$ and $RSSI_{R1 \to R3}$ less than $RSSI_{R1 \to R2}$ place R3 anywhere in the region that is the intersection of the radii $RSSI_{R1 \to R2}$ and $RSSI_{R2 \to R1}$. Any location in said region is here defined as being 'between' two points R1 and R2 and R3 self assigns itself the device identifier 2, being the device identifier of R1+1 and begins its own sequenced activity (e.g. to flash its LED) and transmit a BDM detailing R3 state according to the pattern defined by data in the BDM received from R1. Now, once R3 begins transmitting its BDM, R2 sees that R3 has inserted itself in sequence between R1 and R2 and then increments its own device identifier by one. This, in turn, will appear as an insertion to any beacon in later order that will then, also in turn, increment its device identifier by 1 and so on until all devices have adjusted their sequence order.

If R1 and R2 were first placed out of range of each other, both R1 and R2 will have device identifiers of 0. This can persist since neither R1, nor R2 can see the BDMs of the other.

If R3 is placed between R1 and R2 such that R3 can receive BDMs from both R1 and R2 as shown in FIG. 4(c). R3 receives BDMs from both R1 and R2 and is provided the device identifiers and the RSSI of each of R1 & R2 by those BDMs. Since a BDM includes each devices association matrix, R3 also now knows that R1 and R2 are not in range of each other. In this case R3 arbitrarily chooses one beacon at random, by user setting, or by some other means, will either 'lead' that device or 'follow' it.

As described previously, BDMs are transmitted on a particular frequency by each device. R3 arbitrarily will then choose one BDM to synchronize with as either a 'follower' or a 'leader' where such choice may be by user, random selection or other means. In the case of a follower, the device sets its own device identifier to be the device identifier of the chosen BDM plus 1 and begins its own synchronized activity (e.g. to flash its LED) according to the pattern conveyed by its leader BDM and begins to transmit its own BDM detailing R3 state at a frequency defined by data in the chosen BDM. In the case of a leader, the device sets its own device identifier to be the device identifier of the chosen BDM (R2 say) and begins its own synchronized activity (e.g. to flash its LED) according to the pattern conveyed by that BDM and begins to transmit its own BDM detailing R3 state at a frequency defined by data in the chosen BDM.

R2, on seeing the BDM from R1 will follow the insert procedure described in above, and each device in order will recursively increase its device identifier. Since R3 BDM is synchronized with R2, it is likely that R1 will not see R2 and will continue to flash. However, if it does, it is here defined to convert itself to a follower of R3. This process will then, in turn, renumber each R1 follower until all followers have adjusted their sequence order. In this way, the groups led by devices R1 and R2 are then 'joined' by R3.

As described above, BDMs are emitted on a particular frequency with a specific delay between each device. To be a 'follower,' a device simply times its own BDM to be transmitted at the correct interval after the device chosen leader BDM. To be a leader, the device simply times its own BDM to be transmitted at the correct interval before the device chosen follower BDM. Certain circumstances are ambiguous (e.g. choosing BDMs as described, for example, in Paragraph 0069 above) and could be disambiguated in a number of simple ways. Nothing here precludes disambiguation in any way that satisfies the needs of the application. All other cases for multiple devices $R_3$ to $R_N$ are symmetric and handled in the same ways as described above. There is no explicit association of device identifier to any particular device. Any device can assign itself any device identifier according to the method defined here. Direction is not used or required for disambiguating line activation order.

It is to be appreciated that, although the invention has been described here above with reference to certain examples or embodiments of the invention, various additions, deletions, alterations and modifications may be made to those described examples and embodiments without departing from the intended spirit and scope of the invention. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any invention or example described herein may optionally exist or be utilized in the substantial absence of other elements, steps, members, components, compositions, reactants, parts or portions unless otherwise noted. All reasonable additions, deletions, modifications and alterations are to be considered equivalents of the described examples and embodiments and are to be included within the scope of the following claims.

What is claimed is:

1. A method for causing a group of digital devices to act in a desired order, said method comprising:

causing the digital devices to use a flocking protocol to synchronize the individual digital devices within the group such that they act in the desired order;

wherein the flocking protocol comprises i) causing each device to transmit synchronization information which is received by neighboring devices in the group and ii) causing devices in the group to use received synchronization information to synchronize timing of their actions to that of neighboring devices in the group so that their actions occur in the desired order;

wherein the synchronization information includes an association matrix which is useable by an additional device that becomes added to or inserted in the group to enable that additional device to synchronize the timing of its actions so that the desired order is maintained.

2. The method according to claim 1 wherein the association matrix is used to define a nearest neighbor in a prioritized manner using broadcast only messages not requiring message acknowledgement.

3. The method according to claim 1 wherein the devices comprise clocks and wherein a radio frequency beacon is used to synchronize the clocks.

4. The method according to claim 1 wherein the flocking protocol is used to maintain time and behavior synchronization between the digital devices for the purpose of emitting sound, light, ultrasound or other signals in desired order or pattern.

5. The method according to claim 1 wherein the association matrix comprises a self-assigned device identifier N along with an n bit array wherein each bit represents neighboring devices in order.

6. The method according to claim 1 wherein the synchronization information is transmitted by radio frequency signal and wherein the devices are programmed to determine the received signal strength for each such signal received and to use the received signal strength to determine a device order in the group.

7. The method according to claim 1 wherein the devices comprise signaling devices which emit visible or other signals and wherein the flocking protocol is used to synchronize the timing and/or characteristics of the emitted signals.

8. The method according to claim 7 wherein the synchronization information transmitted by each device comprises declaration message which contains information pertaining to the pattern and/or characteristics of the signal being emitted by that device.

9. The method according to claim 7 wherein the devices additionally receive user-generated external impulses whereby a user may change the order, pattern or other characteristics of signals emitted by the devices.

10. The method according to claim 6 wherein the signaling devices emit flashes of light and wherein the devices use the flocking protocol to self-determine their order so as to synchronize their light flashes so that they occur in a serial order from a first device in the group to a last device in the group.

11. The method according to claim 1 wherein the flocking protocol is used to maintain time and signal emission synchronization between disparate digital traffic management or digital signaling devices.

12. The method according to claim 1 wherein the association matrix conveys information regarding nearest neighbor status between devices in the group.

13. The method according to claim 6 wherein the determination of received signal strength is enhanced by including a transmitted power level within the transmitted signal.

* * * * *